United States Patent
Grace et al.

(10) Patent No.: US 9,954,259 B1
(45) Date of Patent: Apr. 24, 2018

(54) THERMAL EVENT MANAGEMENT SYSTEM FOR AN ELECTRIC VEHICLE

(71) Applicant: Proterra Inc., Greenville, SC (US)

(72) Inventors: Dustin Grace, San Carlos, CA (US); Brian Pevear, San Mateo, CA (US)

(73) Assignee: Proterra Inc., Greenville, SC (US)

( * ) Notice: Subject to any disclaimer, the term of this patent is extended or adjusted under 35 U.S.C. 154(b) by 0 days.

(21) Appl. No.: 15/372,000

(22) Filed: Dec. 7, 2016

(51) Int. Cl.
| | |
|---|---|
| *H01M 10/625* | (2014.01) |
| *H01M 10/613* | (2014.01) |
| *H01M 10/63* | (2014.01) |
| *H01M 10/48* | (2006.01) |
| *H01M 10/42* | (2006.01) |
| *B60L 11/18* | (2006.01) |
| *B60L 3/04* | (2006.01) |

(52) U.S. Cl.
CPC ............... *H01M 10/63* (2015.04); *B60L 3/04* (2013.01); *B60L 11/1864* (2013.01); *B60L 11/1874* (2013.01); *H01M 10/425* (2013.01); *H01M 10/486* (2013.01); *H01M 10/488* (2013.01); *H01M 10/613* (2015.04); *H01M 10/625* (2015.04); *B60L 2250/10* (2013.01); *H01M 2010/4278* (2013.01); *H01M 2200/10* (2013.01); *H01M 2220/20* (2013.01)

(58) Field of Classification Search
CPC ..................... H01M 10/635; H01M 10/613
See application file for complete search history.

(56) References Cited

U.S. PATENT DOCUMENTS

| | | |
|---|---|---|
| 4,633,418 A | 7/1986 | Bishop |
| 5,945,803 A | 8/1999 | Brotto et al. |
| 6,294,897 B1 | 9/2001 | Champlin |
| 7,433,794 B1 | 7/2008 | Berdichevsky et al. |
| 9,046,580 B2 | 6/2015 | Hermann |
| 9,093,726 B2 | 7/2015 | Prilutsky et al. |
| 2009/0261785 A1 | 10/2009 | Cabot et al. |
| 2009/0263708 A1 | 10/2009 | Bender et al. |
| 2010/0136384 A1 | 6/2010 | Kreiner et al. |
| 2012/0105001 A1 | 5/2012 | Gallegos et al. |
| 2013/0049971 A1 | 2/2013 | Hermann et al. |
| 2013/0193918 A1 | 8/2013 | Sarkar et al. |
| 2014/0070767 A1 | 3/2014 | Morris et al. |

*Primary Examiner* — Olatunji Godo
(74) *Attorney, Agent, or Firm* — Bookoff McAndrews, PLLC

(57) ABSTRACT

A method of controlling the battery system of an electric vehicle includes detecting a thermal event in a first battery pack of a plurality of battery packs of the battery system, and at least partially powering down the electric vehicle automatically in response to the detected thermal event. The method may also include initiating a thermal rejection scheme in response to the detected thermal event.

20 Claims, 3 Drawing Sheets

US 9,954,259 B1

THERMAL EVENT MANAGEMENT SYSTEM FOR AN ELECTRIC VEHICLE

TECHNICAL FIELD

Embodiments of this disclosure relate to thermal event management systems for an electric vehicle.

BACKGROUND

An electric vehicle (EV) uses an electric motor for propulsion. Energy required to power the propulsion motor is stored in a battery system located in the vehicle. In many EV applications, lithium ion battery cells are used in their battery systems. It is known that defects in lithium ion battery cells may lead to an unexpected increase in cell temperature. In some cases, the increase in cell temperature may lead to an undesirable thermal event (such as, for e.g., thermal runaway) in the battery system. Embodiments of the current disclosure provide systems and methods to reduce the occurrence or severity of such thermal events. The scope of the current disclosure, however, is defined by the attached claims, and not by the ability to solve any specific problem.

SUMMARY

Embodiments of the present disclosure relate to a thermal event management system of an electric vehicle. Each of the embodiments disclosed herein may include one or more of the features described in connection with any of the other disclosed embodiments.

In one embodiment, a method of controlling the battery system of an electric vehicle is disclosed. The battery system includes a plurality of battery packs, and each battery pack includes multiple battery cells electrically coupled together. The method may include detecting a thermal event in a first battery pack of the plurality of battery packs using an electronic controller of the electric vehicle, and at least partially powering down the electric vehicle automatically in response to the detected thermal event. The method may also include initiating a thermal rejection scheme in response to the detected thermal event.

In another embodiment, a method of controlling the battery system of an electric vehicle is disclosed. The battery system includes a plurality of battery packs, and each battery pack includes multiple battery cells electrically coupled together. The method may include receiving, at an electronic controller, data from one or more sensors coupled to each battery pack of the plurality of battery packs. The method may also include detecting, based on the received data, a thermal event in a first battery pack of the plurality battery packs, and electrically decoupling the first battery pack from the battery system in response to the detecting. The method may further include increasing a rate of cooling of the first battery pack relative to the rate of cooling of a second battery pack of the battery system in response to the detecting.

In yet another embodiment, a method of controlling the battery system of an electric vehicle is disclosed. The battery system includes a plurality of battery packs, and each battery pack includes multiple battery cells electrically coupled together. The method may include detecting, based on data received from one or more sensors coupled to each battery pack of the plurality of battery packs, a thermal event in a first battery pack of the plurality of battery packs. The method may also include sending information regarding the detected thermal event to an operator of the electric bus, and turning off substantially all power from the battery system after a predetermined amount of time after detecting the thermal event. The method may further include increasing a rate of cooling of the first battery pack relative to the rate of cooling of a second battery pack of the plurality of battery packs in response to the detecting.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure.

DETAILED DESCRIPTION

The present disclosure describes a thermal event management system of an electric vehicle. While principles of the current disclosure are described with reference to an electric bus, it should be understood that the disclosure is not limited thereto. Rather, the systems and methods of the present disclosure may be used in any application (electric vehicle, electric machine, electric tool, electric appliance, etc.). In this disclosure, relative terms, such as "about," "substantially," or "approximately" are used to indicate a possible variation of ±10% of a stated value.

Figure 1:
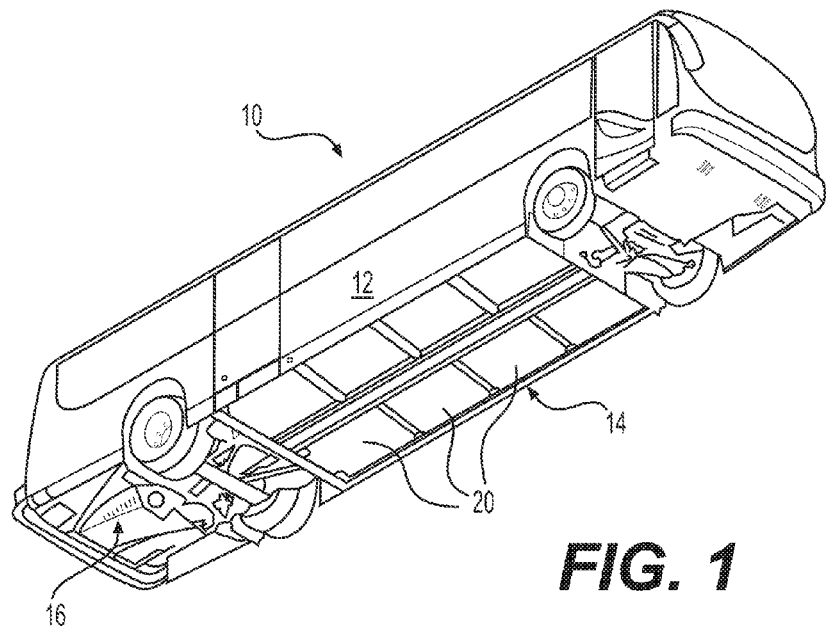
FIG. 1 illustrates an exemplary electric bus having a battery system.

FIG. 1 is a bottom view of exemplary low-floor electric bus 10. As is known in the art, a low-floor bus is a bus with its floor positioned close to the road surface (e.g., 12-16 inches or 30-40 centimeters) to ease passenger entry and exit. Electric bus 10 may include a body 12 enclosing a space for passengers. In some embodiments, the body 12 may be fabricated using composite materials to reduce the weight of the bus 10. One or more electric motors 16 generate power for propulsion of the bus 10, and a battery system 14 stores the electrical energy needed to power the motor(s) 16. When the energy stored in the battery system 14 decreases, it is recharged using power from an external energy source (e.g., utility grid, a bank of batteries, etc.). The battery system 14 may be recharged by any method. Commonly-assigned U.S. Patent Application Publication Nos. US 2013/0193918 A1 and US 2014/0070767 A1, and U.S. patent application Ser. No. 15/227,163, filed Aug. 3, 2016, which are incorporated by reference in their entirety herein, describe exemplary methods for recharging the battery system 14.

Figure 2:
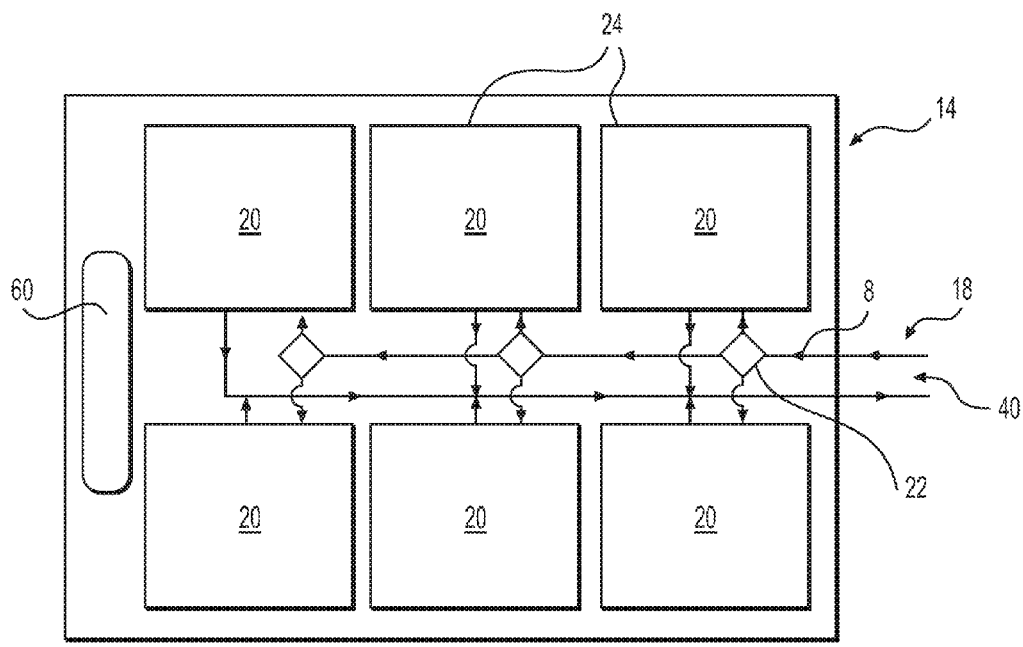
FIG. 2 is a schematic illustration of an exemplary battery system of the bus of FIG. 1.

FIG. 2 is a schematic illustration of an exemplary battery system 14 of bus 10. Battery system 14 may include any type of vehicle battery known in the art. In some embodiments, the battery system 14 may have a modular structure and may be configured as a plurality of battery packs 20 electrically connected together. In general, the battery packs 20 may be positioned anywhere on bus 10 (inside, outside, roof, etc.). In some embodiments, as illustrated in FIG. 1, the battery packs 20 are positioned under the floor of the bus 10. Since the battery system 14 may have considerable weight, positioning the battery packs 20 under the floor may assist in lowering the center of gravity of the bus 10 and balance its weight distribution, thus increasing drivability and safety. Each battery pack 20 includes components (described later) enclosed in a protective housing 24. In general, the battery system 14 may include any number of battery packs 20. These battery packs 20 may be connected together in any manner (series, parallel, or a combination of both). In some embodiments, the battery packs 20 may be arranged in strings. For example, multiple strings of battery packs 20 may be connected in parallel, with each string including a plurality of battery packs 20 connected together in series. Configuring the battery system 14 as parallel-connected strings allows the bus 10 to continue operating with one or more strings disconnected if a battery pack 20 in a string fails. However, in some embodiments, all the battery packs 20 of a battery system 14 may be connected in series or parallel.

Referring to FIG. 2, a battery management system (BMS 60) controls the operations (related to charging, discharging, thermal management, etc.) of the battery system 14. The BMS 60 may include circuit boards, electronic components, sensors, and controllers that monitor the performance of the components of the battery system 14 based on sensor input (e.g., voltage, current, temperature, humidity, pressure, etc.), provide feedback (alarms, alerts, etc.), and control the operation of the battery system 14 for safe and efficient operation of the bus 10. Among other functions, as will be described in more detail later, BMS 60 may thermally and/or electrically isolate portions of the battery system 14 when one or more sensor readings indicate defects in portions of the battery system 14. An exemplary BMS 60 that may be used in battery system 14 is described in commonly-assigned U.S. Patent Application Publication No. US 2012/0105001 A1, which is incorporated by reference in its entirety herein.

Battery system 14 includes a thermal management (TM) system 40 (e.g., heating and/or cooling system) to manage the temperature of the battery packs 20 within acceptable limits. The TM system 40 may include conduits 18 that direct a TM medium 8 (e.g., coolant, etc.) to the different battery packs 20 of the battery system 14. Although not illustrated, a coolant pump may circulate the TM medium 8 through the battery system 14. In some embodiments, the TM medium 8 circulating through the conduits 18 may be a liquid coolant that is used to heat/cool other components of the bus 10. One or more control valves 22 may be fluidly coupled to the conduits 18 and configured to selectively direct the TM medium 8 to one or more desired battery packs 20 of the battery system 14. For example, based on sensor inputs (indicative of the temperature, etc.) from a battery pack 20, the BMS 60 (or another controller) may activate the valves 22 to redirect the TM medium 8 to a battery pack 20 to increase or decrease its temperature.

Figure 3:
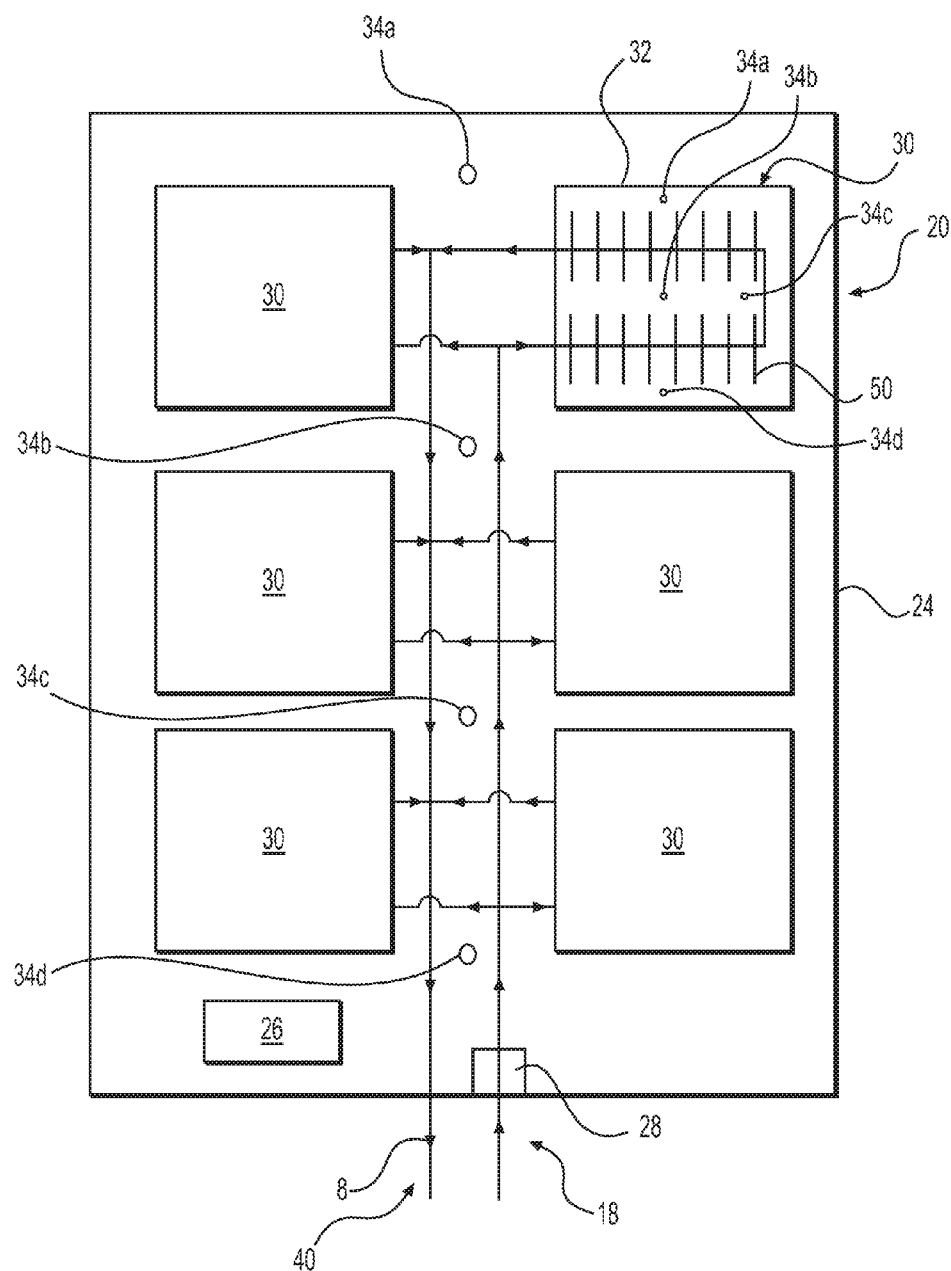
FIG. 3 is a schematic illustration of an exemplary battery pack of the battery system of FIG. 2.

FIG. 3 is a schematic illustration of an exemplary battery pack 20 of battery system 14. As illustrated in FIG. 3, the battery pack 20 includes a plurality of battery modules 30 enclosed within its housing 24. The housing 24 of the battery pack 20 encloses the plurality of battery modules 30 such that these modules 30 are physically isolated, and walled off, from other modules 30 of the battery system 14. Thus, the housing 24 of each battery pack 20 may contain the damage resulting from a catastrophic high temperature event (such as, for example, overheating, arcing, fire, etc.) of a battery module 30 within the battery pack 20, and delay (or prevent) its spreading to other battery packs 20. The housing 24 also assists in focusing additional cooling (as will be described later) to the affected modules 30 to mitigate the severity of the failure. In some embodiments, the battery modules 30 of a battery pack 20 may be separated from each other with dividers (not shown), to protect other battery modules 30 from a battery module 30 experiencing a failure.

The housing 24 and the dividers may be made of a material that does not oxidize or otherwise become damaged when exposed to electrical arcs and/or high temperatures. In some embodiments, the housing 24 may be constructed of high strength, corrosion resistant, and/or puncture resistant materials (e.g., composite materials, Kevlar, stainless steel, aluminum, high strength plastics, etc.). Although not a requirement, in some embodiments, the housing 24 may have a box-like structure and/or may be shaped to allow the battery modules 30 (of the battery pack 20) to be arranged in a single layer to decrease the height of the battery pack 20 (e.g., so that they can be fit under the floor of a low-floor bus). In some embodiments, the housing 24 may be water-tight (e.g., to approximately 1 meter) and have an International Protection (IP) 67 rating for dust and water resistance.

As illustrated on the top right battery module 30 of FIG. 3, each battery module 30 includes a plurality of battery cells 50 packaged together within a casing 32. Similar to housing 24 of a battery pack 20, casing 32 may be configured to contain any failures (electric arcs, fires, etc.) of the cells 50 of the module 30 within the casing 32 and delay the damage from spreading to other modules 30 of the battery pack 20. Casing 32 may be made of any material suitable for this purpose (e.g., Kevlar, aluminum, stainless steel, composites, etc.) In general, the cells 50 may have any shape and structure (cylindrical cell, prismatic cell, pouch cell, etc.). In addition to the cells 50, the casing 32 may also include sensors (e.g., temperature sensor, voltage sensor, humidity sensor, etc.) and controllers that monitor and control the operation of the cells 50. Although not illustrated, casing 32 also includes electrical circuits (voltage and current sense lines, low voltage lines, high voltage lines, etc.), and related accessories (fuses, switches, etc.), that direct electrical current to and from the cells 50 during recharging and discharging.

As known in the art, each battery cell 50 is a unit that comprises two electrodes (anode and a cathode) with an electrolyte (a chemical) between them. Although not a requirement, in some embodiments, the electrolyte may have a lithium-ion chemistry (e.g., lithium-nickel-cobalt-aluminum (NCA), lithium-nickel-manganese-cobalt (NMC), lithium-manganese-spinel (LMO), lithium titanate (LTO), lithium-iron phosphate (LFP), lithium-cobalt oxide (LCO), etc.). Simplistically, when the two electrodes of the cell 50 are connected in a circuit, the chemical energy of the electrolyte is converted to electrical energy. Thus, each battery cell 50 is the smallest self-contained unit that converts chemical energy to electrical energy.

Each battery module 30 is formed by connecting together multiple cells 50 and encasing them in a casing 32, and each battery pack 20 is formed by connecting together multiple modules 30 and encasing them in a housing 24. Although not a requirement, the battery packs 20 of the battery system 14 may be substantially identical to each other (e.g., in terms of number of modules 30, number of cells 50 in each module 30, how the modules 30 and cells 50 are electrically connected together, etc.). Although the battery system 14 of FIG. 2 is illustrated as having six battery packs 20, and the battery pack 20 of FIG. 3 is illustrated as having six battery modules 30, this is only exemplary. Battery system 14 may have any number of battery packs 20, each battery pack 20 may have any number of battery modules 30, and each battery module 30 may have any number of battery cells 50. In some embodiments, the number of battery packs 20 in the battery system 14 may be between about 2-6, the number of battery modules 30 in each battery pack 20 may be between 10-20, and the number of battery cells 50 in each battery module 30 may be between about 400-700.

The battery modules 30 of each battery pack 20, and the battery cells 50 of each battery module 30, may be electrically connected together in series, parallel, or a combination of series and parallel. In some embodiments, some of the battery modules 30 in a battery pack 20 may be connected together in series, and the series-connected modules 30 connected together in parallel. Similarly, in some embodiments, a group of battery cells 50 of each module 30 may be connected together in series to form multiple series-connected groups of cells 50, and these series-connected groups may be connected together in parallel. However, in some embodiments, all the battery modules 30 of a battery pack 20, and all the battery cells 50 of a battery module 30, may be connected together in series or parallel.

In addition to the battery modules 30, the housing 24 of each battery pack 20 may also enclose other components that aid in the functioning of the battery pack 20. These components may include a plurality of sensors 34a, 34b, 34c, 34d that monitor different operating parameters (e.g., current, voltage, etc.) and ambient conditions (temperature, humidity, pressure, etc.) of the battery pack 20. For example, a temperature sensor 34a (e.g., thermistor) may monitor the temperature in the battery pack 20, a humidity sensor 34b may monitor the humidity in the battery pack 20, a pressure sensor 34c may monitor the pressure in the battery pack 20, and a current/voltage sensor 34d may monitor the current/voltage directed into or out of the battery pack 20. In some embodiments, multiple temperature, humidity, pressure, and/or current sensors may be provided at different locations of the battery pack 20. These multiple sensors may be used to monitor the conditions in different regions of the battery pack 20. In some embodiments, one or more temperature, humidity, pressure, and current/voltage sensors 34a, 34b, 34c, 34d may also be provided within every battery module 30 of the battery pack 20 to monitor the conditions in each battery module 30 (or in different regions of the battery module 30). Each battery pack 20 may also include a pack controller 26 that cooperates with the BMS 60 to control the operation of the battery modules 30 based on input from the sensors (e.g., sensors 34a, 34b, 34c, 34d).

The conduits 18 of the TM system 40 may extend into the battery pack 20 through the housing 24. The conduits 18 may also extend into each module 30 of the battery pack 20 through its casing 32. As illustrated in FIG. 3, these conduits 18 may circulate the TM medium 8 through the battery pack 20 and through its multiple modules 30 for thermal management (e.g., heat or cool) of the modules 30. The TM medium 8 passing through each module 30 may be used to control the temperature of the cells 50 in the module 30 within acceptable limits. Although not illustrated in FIG. 3, in some embodiments, valves may also be fluidly coupled to these conduits 18 (e.g., as illustrated in FIG. 2) to selectively direct the TM medium 8 to any desired battery module 30 (e.g., in response to instructions from the pack controller 26 and/or the BMS 60). For example, based on a detected high temperature in a module 30, the pack controller 26 may redirect the TM medium 8 from other modules 30 to the affected module 30 to quickly decrease its temperature. In some embodiments, a TM element 28 (e.g., heater, heat exchanger, chiller, etc.) may also be fluidly coupled to the conduits 18 to heat or cool the TM medium 8. Although not illustrated, in some embodiments, the housing 24 of the battery pack 20 may also include vents, ducts, valves, and other features/components (e.g., fans) to circulate air or another gas through the battery pack 20.

During operation of the battery system 14 (i.e., during charging, discharging, etc.), the battery cells 50 generate heat due to the chemical reactions that occur in these cells. The heat generated by the cells 50 increase the temperature of the battery modules 30. The TM medium 8 (and/or the air) circulating through the battery pack 20 and its modules 30 may remove a portion of the heat to maintain the cells 50 at an acceptable temperature. The BMS 60 (alone or along with other controllers such as pack controller 26) may monitor the temperature of the battery pack 20 and its modules 30 (based, for example, on input from temperature sensors 34a), and increase the rate of cooling of the battery pack 20 if the monitored temperature exceeds a preprogrammed threshold value. The rate of cooling may be increased by any method. In some embodiments, the flow rate of the TM medium 8 through the battery pack 20 (or a specific module 30 in the pack 20) may be increased to increase the rate of cooling.

As is known in the art, in some cases, some of the battery cells 50 of the battery system 14 may experience an unexpected thermal event (e.g., a thermal runaway) resulting in an uncontrolled increase in temperature of the affected battery cells 50. Since the battery cells 50 are in close proximity to each other, if left unchecked, thermal runaway that begins in a few cells 50 can start a chain reaction that spreads to the surrounding cells 50, modules 30, and packs 20. BMS 60 may include a method that detects such thermal events at an early stage and takes remedial action. As described in more detail below, the remedial action may include, among other actions, initiating a thermal rejection scheme to reduce the severity of the thermal event, gracefully powering down the bus 10, and assisting the driver in safely evacuating passengers from the bus 10.

Figure 4:
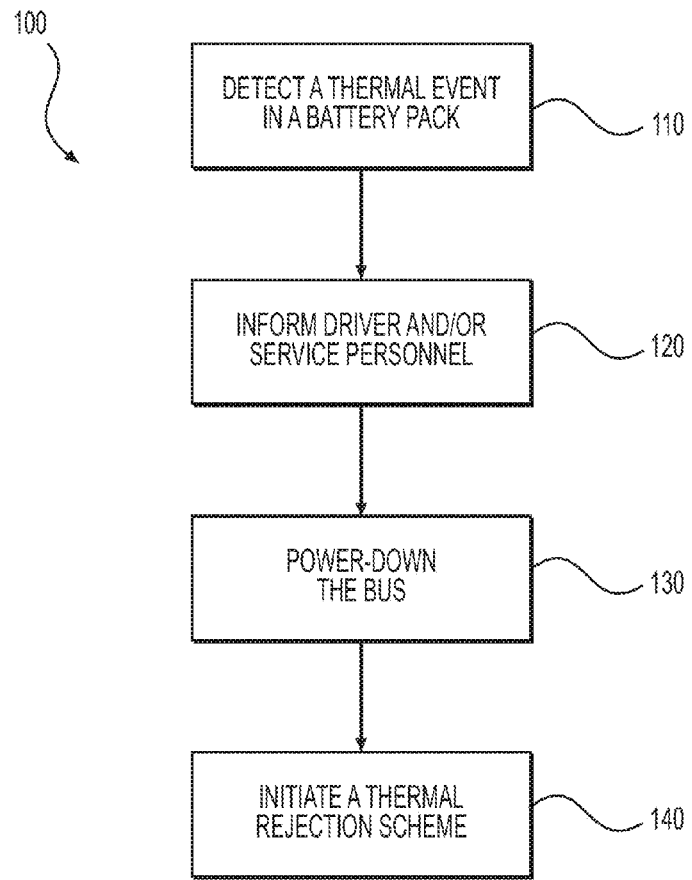
FIG. 4 is a flow chart of an exemplary method of managing a thermal event in the bus of FIG. 1.

FIG. 4 is a flow chart that illustrates an exemplary method 100 used by the BMS 60 to detect a thermal event and take remedial action. In the description below, reference will also be made to FIGS. 2 and 3. The method 100 includes detecting a thermal event in the battery pack (step 110). BMS 60 may detect the thermal event based on signals from one or more of the sensors (e.g., temperature sensor 34a, humidity sensor 34b, pressure sensor 34c, and current/voltage sensor 34d) embedded in a battery module 30 (or a battery pack 20) of the battery system 14. In some embodiments, readings from one or more of these sensors that exceed a threshold value may indicate a thermal event. In some embodiments, a reading from one sensor in a module 30 (or a pack 20) relative to the reading from another sensor may indicate the occurrence of a thermal event. For example, a temperature or humidity reading from a first sensor in a module 30 that is significantly higher than a corresponding reading from a similarly situated second sensor may indicate the occurrence of a thermal event proximate the first sensor. In some embodiments, a combination of signals from several sensors in a module 30 (or a pack 20) may indicate the occurrence of a thermal event.

In some embodiments, the BMS 60 may detect a thermal event in a battery module 30 based on a pressure signal. For example, when battery cells 50 experience a thermal event, a gas is released (or vented) from the affected cells 50. The released gas increases the pressure within the battery module 30 or battery pack 20. This increase in pressure is detected by a pressure sensor 34c positioned in the module 30 or battery pack 30. BMS 60 may be configured to recognize the observed pressure signal (magnitude, rate of change, etc.) as one that results from a thermal event in the module 30. In some embodiments, a humidity sensor 34*b* in the module 30 may detect an increase in humidity resulting from the gas released by an affected cell 50, and the BMS 60 may detect a thermal event based on a signal from the humidity sensor 34*b*.

A thermal event in a module 30 may also be detected by BMS 60 using isolation resistance monitoring. For example, the gas released from an affected cell 50 may be conductive, and the presence of the gas in a battery pack 20 may decrease the isolation resistance between the high voltage system and the low voltage system of the battery pack 20. The BMS 60 may monitor this resistance (for example, using a voltage/current sensor connected between the low and high voltage systems) and detect the occurrence of a thermal event based on the monitored isolation resistance. In some embodiments, a combination of some or all of a pressure signal, a humidity signal, and isolation resistance monitoring may be used to detect the presence of discharged gas in a battery pack 20 (or battery module 30). Detecting a thermal event based by detecting the gas discharged from a battery cell 50 may enable the thermal event to be detected closer to its onset.

In some embodiments, the BMS 60 may detect a thermal event in a module 30 based on a signal from the temperature sensor 34*a* in the module 30. For example, a temperature recorded by a temperature sensor 34*a*, or the rate of temperature increase recorded by one temperature sensor 34*a* (in a module 30 or a pack 20) relative to other temperature sensors 34*a* (in the same module 30 or pack 20) may be indicative of a thermal event. In some embodiments, BMS 60 may detect the onset or the existence of a thermal event based on a combination of readings from multiple sensors (temperature sensor 34*a*, humidity sensor 34*b*, pressure sensor 34*c*, etc.).

When a thermal event is detected in the battery system 14, the BMS 60 may inform the driver and/or other relevant authorities (e.g., service personnel, bus operator, etc.) of the thermal event (step 120). Informing the driver may include one or more of sounding an audio alarm, activating one or more indicator lights, and/or displaying messages on the bus display system (e.g., a display screen positioned in view of the driver within the bus 10). These messages may include, among others, information about the location of the thermal event, and instructions to pull the bus 10 over (if the bus 10 is in motion) and begin an evacuation process. Bus 10 has several doors/hatches that a passenger may use to exit the bus 10 (e.g., front door, rear door, roof hatch, etc.). The messages to the driver may include suggestions to evacuate the bus 10 using a particular exit based on where the thermal event is occurring. For example, if the BMS 60 detects that the thermal event is occurring in a battery pack 20 positioned towards the front of the bus 10, the BMS 60 may instruct the driver to evacuate the bus 10 using the rear door. In some embodiments, the BMS 60 may also automatically open the suggested exit door (and or other doors and windows), and/or activate other systems of the bus 10 (e.g., lights, etc.) to speed the evacuation process. In some embodiments, alternate to, or in addition to, the displayed messages, the BMS 60 may also provide verbal instructions to the driver and passengers over an audio system of the bus 10. The BMS 60 may also automatically contact and report (e.g., wirelessly) the detected thermal event to service personnel (and/or other authorities) so that they can quickly respond to the disabled bus 10.

Upon detection of a thermal event, the BMS 60 may also power down the bus 10 (step 130). The bus 10 may be powered down in a manner that gives the driver enough time to stop the bus 10 at a suitable location, and the passengers enough time to exit the bus 10. For example, in some embodiments, upon detection of a thermal event in a battery module 30 of a battery pack 20, the BMS 60 may immediately (or after a predetermined amount of time) electrically decouple (e.g., by opening contactors) the affected battery pack 20 from the electrical system of the bus 10, and derate the power supplied to the bus 10. Power to various systems of the bus 10 (HVAC, powertrain, etc.) may then be sequentially terminated (e.g., after predetermined amounts of time), such that the bus 10 is slowly and gracefully powered off. That is, substantially all the power from the battery system 14 may be turned off after a finite (non-zero) and predetermined amount of time after detecting the thermal event (step 110). In some embodiments, as the various systems are progressively powered down, additional battery packs 20 may be decoupled from the electrical system. The driver may be alerted (e.g., by displayed or announced messages, etc.) prior to powering down each system. In some embodiments, the driver may be able to override the BMS 60 and delay the powering down of any particular system (e.g., propulsion system, etc.) to increase the time available to stop and/or evacuate the bus. Powering down the bus 10 in this manner may enable the passengers to be safely evacuated while minimizing damage to the bus 10 and the environment.

The BMS 60 may also initiate a thermal rejection scheme which accelerates the removal of heat from the affected module 30 (or pack 20) upon detection of a thermal event in the battery system 14 (step 140). In some embodiments, the thermal rejection scheme may include increasing the rate of flow of the TM medium 8 to an affected battery module 30 when a thermal event is detected in the module 30. For example, when the sensors embedded in a battery module 30 indicates that a thermal event is occurring in a battery module 30 of a battery pack 20, the BMS 60 may control the coolant pump (fluidly coupled to the conduits 18) to increase the flow rate of the TM medium 8 in the battery system 14. In some embodiments, the TM medium 8 flowing through other battery packs 20 of the battery system 14 may be redirected (e.g., by selectively closing and opening valves 22) to the affected battery pack 20 to increase heat rejection from the affected battery pack 20, and thereby, quench or minimize the effects of the detected thermal event. In some embodiments, fluid valves in the affected battery pack 20 may also be adjusted (e.g., opened, closed, etc.) to increase the flow of the TM medium 8 through the affected module 30 and increase heat rejection from the module 30.

Alternatively or additionally, in some embodiments, the BMS 60 may control a chiller (or heat exchanger) in TM element 28 to cool the TM medium 8 in an affected battery pack 20 to increase TM rejection from the battery pack 20. For example, when a thermal event is detected in a battery pack 20, the BMS 60 may increase the flow of the TM medium 8 into the affected battery pack 20 and activate the chiller to cool the TM medium 8 entering the affected battery pack 20. In some embodiments, a blast of air, fire retardant, or another suitable fluid (e.g., carbon dioxide, halon, etc.) may be directed into an affected battery pack 20 in response to the detection of a thermal event in the battery pack 20. For example, battery system 14 may include ducting (with valves) that fluidly couples a canister containing a gas (or a fluid) with the plurality of battery packs 20 of the battery system 14. And, when a thermal event is detected in a battery pack 20, the BMS 60 may activate the flow of the gas from the canister, and control the valves coupled to the ducting, to direct the gas into the affected battery pack 20 to minimize the severity of the detected thermal event. In some embodiments, an onboard compressor on the bus 10 (e.g., of the air suspension system or the braking system) may act as a primary or a secondary power source for moving the gas through the affected battery pack 20.

In some embodiments, the thermal rejection scheme employed by the BMS 60 in response to a detected thermal event may depend upon the gravity of the detected event. For example, in an embodiment of the method, the thermal rejection schemes employed by the BMS 60 may include: (a) controlling the coolant pump to increase the flow rate of the TM medium 8 into the battery system 14; (b) redirecting the TM medium 8 from all battery packs 20 to the affected battery pack 20 by controlling the valves; (c) activating the chiller in the affected battery pack to cool the TM medium 8; and (d) directing a burst of a fire retardant into the affected battery pack 20. And, based on the severity of the detected thermal event (judged, for example, based on one or more sensor readings), the BMS 60 may select one or a combination of these schemes (e.g., only (a), a combination of (a), (b), (c), (d), etc.) to employ to respond to the thermal event.

Although FIG. 4, illustrates the different steps of the method 100 as being performed in a serial manner, this is only exemplary. In some embodiments, the different steps may be performed simultaneously (or in parallel). For example, upon detection of the thermal event (i.e., step 110), the BMS 60 may simultaneously inform the driver (step 120), start the power down process (step 130), and initiate the thermal rejection scheme (140). It should also be noted that, although the BMS 60 is described as performing the steps of the described method 100, this is only exemplary. In general, any controller (or collection of controllers) of the bus 10 may some or all the steps of the method. Additionally, although the method 100 is described with reference to the battery system 14 of the bus 10, this is only exemplary. In general, the method may be applied to mitigate a detected thermal event anywhere on the bus 10.

While principles of the present disclosure are described herein with reference to the battery system of an electric bus, it should be understood that the disclosure is not limited thereto. Rather, the systems described herein may be employed in the batteries of any application. Also, those having ordinary skill in the art and access to the teachings provided herein will recognize additional modifications, applications, embodiments, and substitution of equivalents all fall within the scope of the embodiments described herein. Accordingly, the disclosure is not to be considered as limited by the foregoing description. For example, while certain features have been described in connection with various embodiments, it is to be understood that any feature described in conjunction with any embodiment disclosed herein may be used with any other embodiment disclosed herein.

We claim:

1. A method of controlling the battery system of an electric vehicle, the battery system including a plurality of battery packs, each battery pack including multiple battery cells electrically coupled together, comprising:
   detecting a thermal event in a first battery pack of the plurality of battery packs using an electronic controller of the electric vehicle;
   at least partially powering down the electric vehicle automatically in response to the detected thermal event; and
   initiating a thermal rejection scheme in response to the detected thermal event.

2. The method of claim 1, wherein initiating a thermal rejection scheme includes increasing a rate of cooling of the first battery pack relative to the rate of cooling of a second battery pack of the plurality of battery packs.

3. The method of claim 2, wherein increasing the rate of cooling includes increasing a flow of a coolant through the first battery pack relative to the flow of coolant through the second battery pack.

4. The method of claim 3, wherein increasing the flow of a coolant includes redirecting the flow of coolant from the second battery pack to the first battery pack.

5. The method of claim 1, further including displaying messages regarding the detected thermal event on a display device of the electric vehicle, the messages including at least one of a location of the detected thermal event, or instructions to exit the electric vehicle.

6. The method of claim 1, wherein at least partially powering down the electric vehicle includes turning off substantially all power from the battery system after a predetermined amount of time after detecting the thermal event.

7. The method of claim 1, wherein detecting a thermal event includes detecting the thermal event based on signals from one or more sensors located in the first battery pack.

8. The method of claim 1, wherein detecting a thermal event includes detecting the thermal event based on signals from a pressure sensor located in the first battery pack.

9. The method of claim 1, wherein detecting a thermal event includes detecting the thermal event based on signals from a humidity sensor located in the first battery pack.

10. A method of controlling the battery system of an electric vehicle, the battery system including a plurality of battery packs, each battery pack including multiple battery cells electrically coupled together, comprising:
    receiving, at an electronic controller, data from one or more sensors coupled to each battery pack of the plurality of battery packs;
    detecting, based on the received data, a thermal event in a first battery pack of the plurality battery packs;
    electrically decoupling the first battery pack from the battery system in response to the detecting; and
    increasing a rate of cooling of the first battery pack relative to the rate of cooling of a second battery pack of the battery system in response to the detecting.

11. The method of claim 10, further including turning off substantially all power from the battery system after a predetermined amount of time after detecting the thermal event.

12. The method of claim 10, further including sending information to an operator of the electric vehicle in response to the detecting, the information including instructions to evacuate the vehicle using an indicated exit of the electric vehicle.

13. The method of claim 10, further including wirelessly sending information regarding the detected thermal event to a location remote from the electric vehicle in response to the detecting.

14. The method of claim 10, wherein the receiving data includes receiving data indicative of a gas being released from one or more battery cells of the first battery pack.

15. The method of claim 10, wherein increasing a rate of cooling includes redirecting a flow of a coolant from the second battery pack to the first battery pack.

16. A method of controlling the battery system of an electric bus, the battery system including a plurality of battery packs, each battery pack including multiple battery cells electrically coupled together, comprising:
    detecting, based on data received from one or more sensors coupled to each battery pack of the plurality of battery packs, a thermal event in a first battery pack of the plurality of battery packs;

sending information regarding the detected thermal event to an operator of the electric bus;

turning off substantially all power from the battery system after a predetermined amount of time after detecting the thermal event; and increasing a rate of cooling of the first battery pack relative to the rate of cooling of a second battery pack of the plurality of battery packs in response to the detecting.

17. The method of claim 16, wherein the detecting includes detecting a thermal event based on data indicative of a gas being released from at least one battery cell of the multiple battery cells in the first battery pack.

18. The method of claim 17, further including receiving data indicative of a gas being released from at least one of (a) a pressure sensor, and (b) a humidity sensor.

19. The method of claim 16, wherein turning off substantially all power from the battery system includes sequentially turning off power to different systems of the bus at different times.

20. The method of claim 16, wherein increasing a rate of cooling includes redirecting a flow of a coolant from the second battery pack to the first battery pack.

* * * * *